United States Patent [19]
Gilliland et al.

[11] 3,861,292
[45] Jan. 21, 1975

[54] LIQUID SMOKE REGENERATOR

[75] Inventors: Robert D. Gilliland, Louisville, Ky.; Hugo E. Wistreich, Chicago, Ill.

[73] Assignee: B. Heller & Company, Chicago, Ill.

[22] Filed: Apr. 30, 1973

[21] Appl. No.: 355,585

[52] U.S. Cl. ................................................. 99/476
[51] Int. Cl. ............................................. A23b 1/04
[58] Field of Search ...................... 99/474, 467, 476

[56] References Cited
UNITED STATES PATENTS
| | | | |
|---|---|---|---|
| 2,380,428 | 7/1945 | Gilliam | 99/476 |
| 3,763,767 | 10/1973 | Baker | 99/476 |

*Primary Examiner*—John W. Huckert
*Assistant Examiner*—Edward J. McCarthy

[57] ABSTRACT

A liquid smoke regenerator for use in connection with a smoke house comprising an elongate chamber having an inlet in communication with an outlet from the smoke house and an outlet in communication with the inlet to the smoke house, blower means for recirculating gaseous vapors from the regenerator to the smoke house and back, spray means located adjacent the inlet to the regenerator for spraying liquid smoke into the interior of the regenerator and into the path of the recirculated gaseous vapors for entrainment therewith and heating elements located within the regenerator housing in spaced apart relation from the inlet for heating the gaseous vapors passing therethrough to a temperature within the range of 210°–400°F before passage from the regenerator into the smoke house.

12 Claims, 1 Drawing Figure

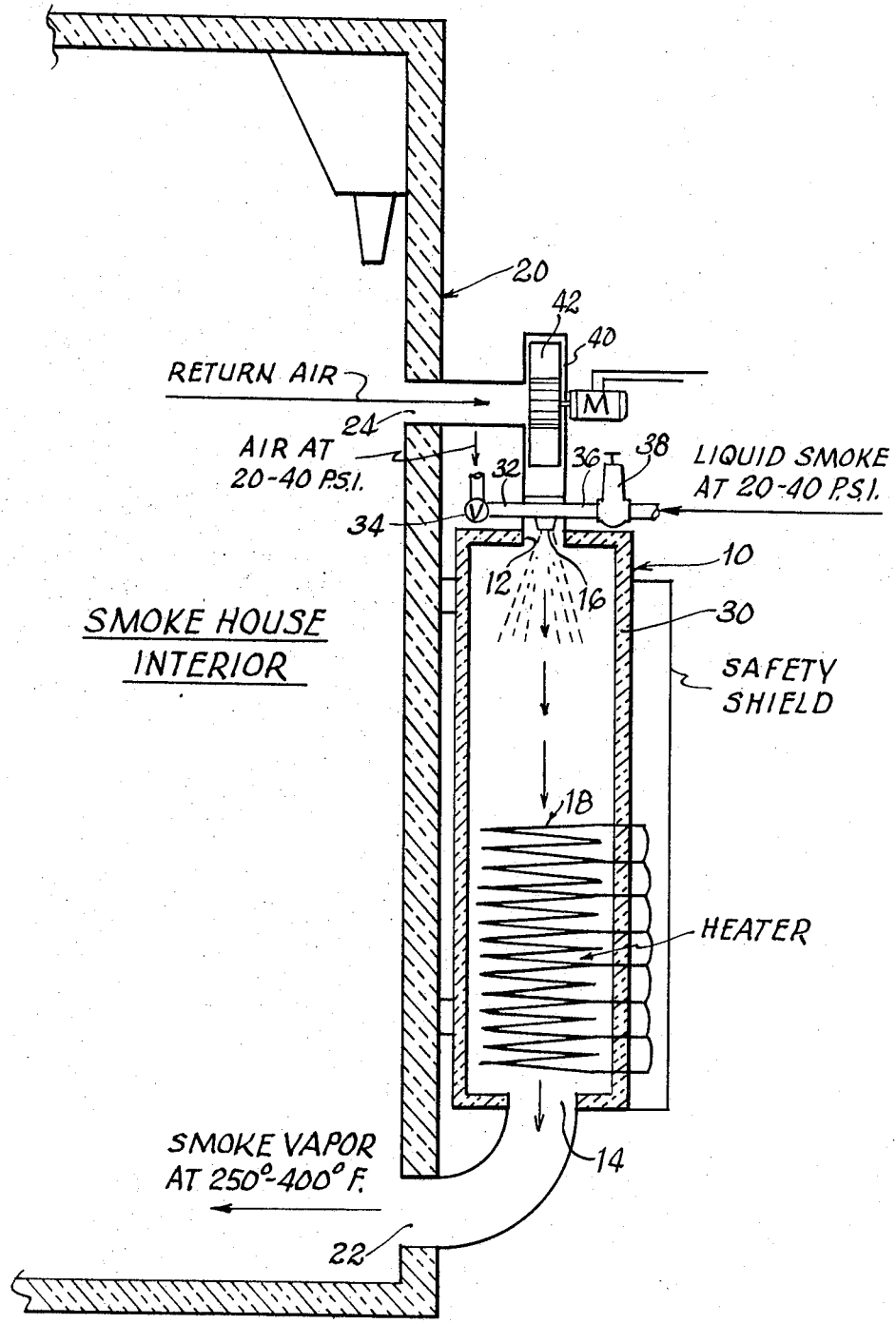

LIQUID SMOKE REGENERATOR

This invention relates to the regeneration of smoke from a liquid medium, hereinafter referred to as "liquid smoke," and to the efficient utilization of the regenerated smoke in the preparation of smoked products.

Liquid smoke comprises the condensation through smoke in an aqueous medium, with and without the addition of other ingredients which may be effective either to increase the amount of smoke generated or the effect thereof in the treatment of various products and materials, such as in the production of smoked meats, smoked fish, and the like. Liquid smokes of the types described are readily available commercially in various concentrations, such as CharSol C–10, CharSol C–12, etc., marketed by B. Heller & Company, of Chicago, Illinois. Description thereof may be found in U.S. Pat. No. 3,503,760, Canadian Pat. No. 603,487, and the co-pending United States application Ser. No. 328,418, filed Jan. 31, 1973.

As described in the U.S. Pat. No. 3,503,760, one method for utilization of the liquid smoke has been to reduce the liquid smoke into droplets of a size less than 150 microns to form a cloud, and then exposing the food products to be smoked directly to the droplets suspended in the treating space for direct contact.

Uniform smoking by the technique described depends upon the ability of the cloud to penetrate into the innermost recesses of the products to be smoked and the smoke is not in a form whereby maximum effectiveness can be derived therefrom. Furthermore, only a small fraction of the liquid smoke is utilized while the rest settles on the smokehouse floor and walls where it is wasted and where it introduces undesirable pollution into the environment. This amounts to an inefficient utilization of the liquid smoke and undesirable pollution of the environment.

In the Canadian Pat. No. 603,487, the liquid smoke is sprayed directly onto a hot plate wherein the liquid smoke is revaporized, except for portions which are thermally decomposed to form an undesirable residue on the hot plate. The hot plate is located within the smokehouse so that the chamber is filled with smoke that is regenerated on the hot plate and then vented off into the atmosphere.

The use of a hot plate, onto which the liquid smoke is applied for regeneration, requires the use of a hot plate maintained at such high temperature for vaporization of the liquid smoke that an excessive amount of decomposition occurs. The decomposition products generate vapors which contaminate the smoky taste desired in the food product and the hot plate requires frequent cleaning to remove the contaminants which cake as solid on the hot plate surface. Again the smoke exhausted from the smokehouse into the atmosphere constitutes undesirable pollutants.

It is an object of this invention to provide a regenerator for use with liquid smoke which permits substantially complete regeneration of the smoke contained therein, in which the amount and rate of smoke generation can be accurately adjusted and controlled for varying the amount of smoke that is made available for certain food products, in which the smoke and vapors are made available at elevated temperature for maximizing the effectiveness of the regenerated smoke, in which the regenerated smoke is recycled thereby to derive high yield from the smoke content of the liquid smoke without release of smoke pollutants into the atmosphere, and wherein the liquid smoke is converted to a vapor form without decomposition and with a gaseous carrier, such as air, for transportation from the regenerating station to the station of use and back.

These and other objects and advantages of this invention will hereinafter appear and for purposes of illustration, but not of limitation, an embodiment of the invention is shown in the accompanying drawing.

In accordance with the practice of this invention, the regenerator comprises an insulated elongate housing 10, preferably of cylindrical shape, with an inlet 12 at one end and an outlet 14 at the other end. Liquid smoke is introduced as a spray from spray head 16 into a stream of air entering the housing through the inlet 12. Heating elements 18 are provided within the interior of the housing, in spaced relation from the inlet 12 and preferably adjacent the outlet 14, whereby the stream of air and liquid smoke particles, which travel through the housing from the inlet 12 to the outlet 14, will pass in the immediate vicinity of the heating element 18 and thereby raised to a temperature above the boiling point temperature for the liquid smoke to cause reconversion of the elements to their corresponding vapor form of water vapor and smoke.

The regenerator is located adjacent a smoke house 20 with the regenerator outlet 14 communicating with the smoke house 20 through an inlet 22 and with the regenerator inlet 12 communicating with the smoke house 20 through an inlet 24, whereby the smoke regenerated in the housing 10 continuously recirculates from the regenerator into the smokehouse 20 and from the smokehouse 20 back into the regenerator where the recycled unused smoke is supplemented by increments of newly generated smoke, thereby to reduce the amount of smoke required to be regenerated while, at the same time, reducing the amount of heat input into the unit.

Still further, recirculation from the smokehouse 20 into the regenerator, makes a smoke filled air available at elevated temperature, whereby vaporization of the liquid smoke sprayed into the regenerator, commences in advance of the heating means and separate and apart therefrom. This reduces the amount of heat input required for regeneration and for heating the vapors to the desired temperature for introduction into the smokehouse.

In the illustrated modification, the regenerator 10 is in the form of a double walled stainless steel cylinder having thermal insulating material, such as vermiculite, filling the space 30 in between. In the illustrated modification, the regenerator has an internal diameter of 10 inches and a height of about 4½ feet.

The cylindrical section is closed at the upper end except for the inlet opening 12 communicating with a feed passage fitted with a downwardly directed spray nozzle 16 into which air under pressure, such as 20 to 40 pounds per square inch, is introduced through pipe 32 provided with a control valve 34. Liquid smoke under pressure, such as 20 to 40 pounds per square inch, is introduced through pipe 36 having a flow meter 38 for varying the rate of introduction of the liquid smoke from a supply source which is not shown.

Beyond the nozzle 16, in the direction away from the inlet 12, the feed passage communicates with a fan housing 40 embodying a blower 42, preferably of the squirrel cage type, which communicates with the outlet 24 from the smokehouse to recirculate smoke and gases extracted from the smokehouse into the regenerator and past the spray nozzle for entrainment with the air and liquid smoke sprayed into the gaseous stream that is recycled for introduction at high velocity into the regenerator.

The heating section 18 is in the form of electrical heating coils, such as cal rod units, electrical resistance units or heat exchange units heated by high pressure steam or gas, which units are preferably encased within stainless steel for protection. The heating coils occupy less than one-half of the length of the regenerator section and are spaced from the inlet and preferably adjacent the outlet 14.

In the illustrated modification, use is made of electrical heating units having a capacity of about 10,000 watts, operating at 220 volts. The amount of heat generated is sufficient to raise the temperature of the by-passing vapors to above vaporization temperature and preferably to a temperature within the range of 210°–400°F. Under these conditions, all of the liquid will be converted to vapor and smoke which passes continuously from the regenerator through the outlet 14 into the smokehouse 20.

In the preferred practice of this invention, the regenerator is mounted to extend vertically with the inlet 12 at the top and the outlet 14 at the bottom so that liquid smoke sprayed into the recycled stream will flow downwardly through the chamber from the inlet to the outlet. Under such circumstances, advantage can be taken of gravitational force to insure displacement of the spray particles of liquid smoke, downwardly through the chamber and through the hot vaporization zone. Any particles that might escape vaporization will settle to the bottom of the chamber where they will not interfere with vapor flow and where such fluids can be drained into a suitable receiver or into the smokehouse, without buildup of the type that would clog the recirculation of the vapors.

Under such circumstances, the regenerated vapors can be fed directly into the lower portion of the smokehouse to insure complete filling of the smokehouse before withdrawal of smoke from the housing through the outlet for recycling through the regenerator. It will be understood, however, that the direction of the regenerator can be reversed to locate the inlet at the bottom and the outlet at the top or the regenerator can be disposed horizontally with the inlet at one end and the outlet at the other, preferably nearest the smokehouse. When disposed vertically, the regenerator can be suspended from a suitable support from the outer wall of the smokehouse.

In the illustrated modification the amount of air displaced by the blower into the housing will correspond to about 150–250 cubic feet of air per minute while the amount of liquid smoke capable of being converted under the conditions described will be in the range of about 2 to 4 ounces per minute. This is sufficient smoke to satisfy two to six normally sized smoke cages, with the amount of smoke adjustable by adjustment of the feed rate of liquid smoke, to lightly smoke wieners or to heavily smoke polish sausage.

The introduction of previously regenerated smoke at elevated temperature into the smokehouse has the effect of materially reducing smokehouse clean-up time as well as cost since no burned ingredients or pools of liquid will form in the smokehouse. Also eliminated is the need to store and handle large volumes of sawdust burned for on-site generation of smoke, as well as the work and cost for operating and maintaining conventional on-site smoke generators. Pollution is materially reduced as well as the need for after-burners to consume smoke particles otherwise exhausted into the atmosphere.

Aside from the described advantages, more efficient and effective utilization is made of the liquid smoke, including the cost of heat, not only for regeneration, but for heating the smokehouse.

It will be understood that changes may be made in the details of construction, arrangement and operation without departing from the spirit of the invention, especially as defined in the following claims.

We claim:

1. The combination comprising a smokehouse having a smoke inlet at one level and a smoke outlet at another level, and a smoke regenerator for the regeneration of smoke from liquid smoke comprising an elongate housing having an inlet at one end portion and an outlet at the other end portion, a first passage communicating the outlet from the smokehouse with the inlet to the regenerator housing and another passage communicating the inlet to the smokehouse with the outlet from the regenerator housing, a recirculating means in communication with the first passage for withdrawing gaseous vapors from the smokehouse and recirculating such gaseous vapors through the inlet to the regenerator housing and through the housing for return to the smokehouse, spray means adjacent the inlet to the regenerator housing, means communicating the spray means with a source of liquid smoke and a source of gas under positive pressure whereby the liquid smoke is sprayed as fine particles into the stream of gaseous vapors recirculated through the regenerator housing, heaters located within the regenerator housing in spaced apart relation from the inlet and adjacent the outlet for heating the gaseous vapors and spray to a temperature above vaporization temperature whereby the liquid smoke is reconverted to water vapor and smoke which is admixed with the recycled gaseous vapors from the smokehouse for introduction through the inlet into the smokehouse.

2. The combination as claimed in claim 1 in which the inlet to the smokehouse is at a lower level and the outlet is at a higher level.

3. The combination as claimed in claim 1 in which the elongate regenerator housing is vertically disposed with the inlet at the upper portion and the outlet at the lower portion.

4. The combination as claimed in claim 1 in which the recirculating means comprises a blower located within the passage, with the blower having an outlet for directing the gaseous vapors at high velocity to the inlet to the regenerator housing.

5. The combination as claimed in claim 1 in which the spray is directed into the regenerator housing in the direction corresponding to the gaseous vapors recycled from the smokehouse for entrainment of the spray therewith.

6. The combination as claimed in claim 1 in which the heating means is located in the half of the regenerator housing opposite the inlet.

7. The combination as claimed in claim 1 in which the heaters comprise cal rod or electrical resistance units.

8. The combination as claimed in claim 1 in which the vapors are heated to a temperature within the range of 210°–400°F before passage from the regenerator housing to the smokehouse.

9. A liquid smoke regenerator comprising an elongate regenerator housing having an inlet at one end and an outlet at the other, a source of liquid smoke, a source of air under pressure, spray means located adjacent the inlet, passages communicating the spray means with the source of liquid smoke and the source of air under pressure for spraying the liquid smoke into the regenerator housing, a blower upstream of the inlet for circulating gaseous vapors through the inlet and through the regenerator housing, heating means within the regenerator housing spaced from the inlet and adjacent the outlet, through which the gaseous vapors pass for heating to above vaporization temperature.

10. A liquid smoke regenerator as claimed in claim 9 in which the spray is directed into the regenerator housing in a direction corresponding to the direction of the gaseous vapors introduced through the inlet into the regenerator housing.

11. A liquid smoke regenerator as claimed in claim 9 in which the heating means is located in the half of the regenerator housing opposite the inlet.

12. A liquid smoke regenerator as claimed in claim 9 in which the vapors are heated in the regenerator housing to a temperature within the range of 210°–400°F.

* * * * *